Figure 1:
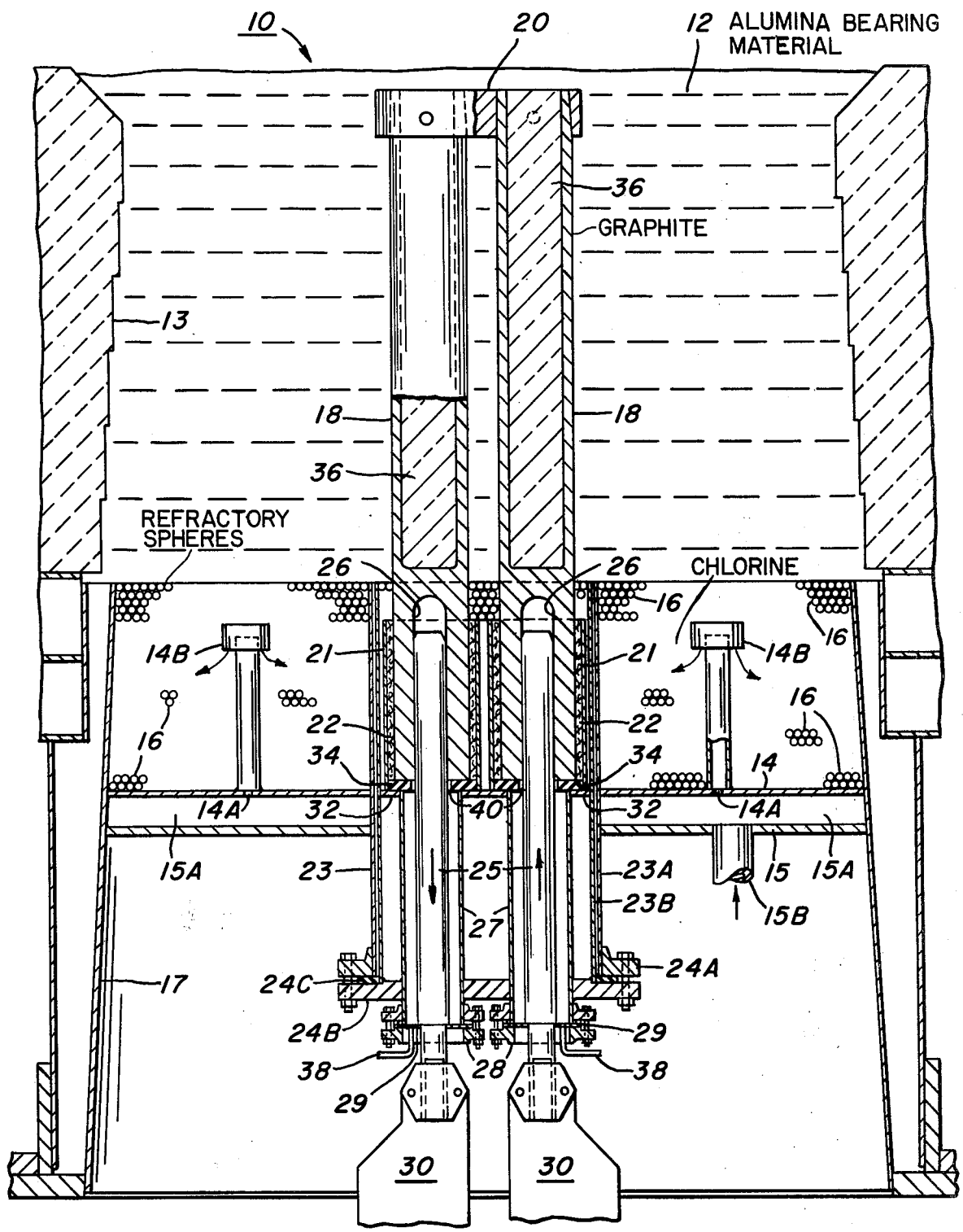

United States Patent [19]

King et al.

[11] 4,171,346
[45] Oct. 16, 1979

[54] REACTOR HEATER

[75] Inventors: Larry K. King; Roy E. Hardwick, both of Maryville, Tenn.

[73] Assignee: Aluminum Company of America, Pittsburgh, Pa.

[21] Appl. No.: 857,201

[22] Filed: Dec. 5, 1977

Related U.S. Application Data

[63] Continuation of Ser. No. 752,788, Dec. 20, 1976, abandoned.

[51] Int. Cl.² .............................................. C01F 7/56
[52] U.S. Cl. ..................................... 423/496; 13/25; 219/390; 219/523; 219/553; 422/146; 422/199
[58] Field of Search .............. 219/523, 543, 552, 553, 219/390; 13/22, 25, 7; 423/495, 496; 75/68 R, 68 B, 68 A; 23/277 R, 288 S, 284; 422/146, 199

[56] References Cited

U.S. PATENT DOCUMENTS

| | | | |
|---|---|---|---|
| 2,294,034 | 8/1942 | Jaeger | 13/31 |
| 2,551,341 | 5/1951 | Scheer et al. | 13/31 |
| 2,681,943 | 6/1954 | Hartwick | 23/277 R |
| 2,768,277 | 10/1956 | Buck et al. | 13/25 |
| 3,004,090 | 10/1961 | Donovan et al. | 13/25 |
| 3,058,817 | 10/1962 | Irani | 23/284 |
| 3,383,497 | 5/1968 | Harris | 219/553 |
| 3,395,241 | 7/1968 | Roman | 13/25 |
| 3,409,728 | 11/1968 | Jaques | 13/25 |
| 3,753,660 | 8/1973 | Langenhoff | 13/7 |
| 3,796,551 | 3/1974 | Pope | 23/284 |
| 4,049,385 | 9/1977 | Bohnenstingl et al. | 23/284 |

FOREIGN PATENT DOCUMENTS

| | | | |
|---|---|---|---|
| 2031694 | 11/1970 | France | 13/25 |
| 41-22161 | 12/1966 | Japan | 13/31 |

OTHER PUBLICATIONS

"Electrolysis of Aluminum Chloride", Grothe, Z., Erzbergbau und Metallhuttenwesen 3 (1950) 213–220, pp. 9–11.

Primary Examiner—Roy N. Envall, Jr.
Assistant Examiner—Bernard Roskoski
Attorney, Agent, or Firm—Elroy Strickland

[57] ABSTRACT

An electrical resistance heater for high temperature chlorination of alumina bearing material by gaseous chlorine within a reaction chamber. The heater comprises two, closely spaced, side-by-side, elongated posts made of a carbonaceous material electrically connected together adjacent one of their ends. Two metal bars extend respectively into the other ends of the posts for directing electrical current through the posts. Means are provided for directing an inert gas along the external surfaces of the posts that tend to be cooler than the portions of the posts located to provide the high temperature.

2 Claims, 4 Drawing Figures

REACTOR HEATER

This is a continuation of application Ser. No. 752,788, filed Dec. 20, 1976 now abandoned.

BACKGROUND OF THE INVENTION

The present invention relates generally to electric resistance heaters and particularly to heater structures for heating alumina bearing material in a chamber adapted to react the alumina of the material with gaseous chlorine.

In making aluminum chloride, for example, a chamber is employed for receiving and holding an alumina bearing material, such as porous alumina particles that have been intimately intermixed with carbon. A stream of gaseous chlorine is directed through the material and chamber to react with the alumina to form a gaseous effluent containing aluminum chloride and carbon oxides. From this effluent the aluminum chloride is recovered. Even though the reaction is exothermic after the reaction has started, an initial input of heat is required to start the reaction, and such initial input of heat is particularly efficient if the source of the heat is disposed directly in the alumina bearing material.

It is expected that a carbonaceous material, such as graphite, because of its generally corrosion and heat resistant characteristics, would be suitable for making a heater or heating elements for use in the environment found in a chlorine-alumina reactor. However, it has been found that graphite is attacked by certain constituents in the reactor in the temperature range of about 200° to 400° C. This is consistent with the findings of Hans Grothe, as discussed on pages 9 to 11 of an article entitled "Electrolysis of Aluminum Chloride" published in Z. Erzbergbau und Metallhuttenwesen 3 (1950), 213–220. Grothe found that "graphite anodes are not destroyed when electrolysis is carried out at rather high temperatures—at least above 450° C.".

An attacking constituent in the above low temperature range in a reactor is believed to be ferric chloride. Ferrous constituents are originally in the alumina bearing material as an impurity, and some ferrous material enters into the reactor via the chlorine directed to the reactor through iron and steel pipes or tubes. In the reacting process ferric chloride is formed and attacks the graphite of the heater by apparently entering the molecular structure of the graphite which weakens the same.

Another problem that has been encountered in developing heaters for reactor chambers has been the substantial expansion of heater components within the reactor when the reactor reaches its operating temperature. In experimenting with elongated graphite cross members (as heaters) attached to two widely spaced apart graphite posts by graphite pins or bolts, the cross members expanded longitudinally to such an extent that the posts, cross members and pins cracked and broke.

BRIEF SUMMARY OF THE INVENTION

The present invention overcomes the above problems and involves the phenomenon in which graphite is not attacked by a chlorine-chloride environment at temperatures above 400° C. and in the temperature range of 500° to 750° C., which is a preferable operating range for an alumina-chlorine reactor. The problem of expansion is overcome by using two side-by-side, closely spaced, graphite posts, which rods may be separate and distinct post structures, or a unitary post structure longitudinally divided by a layer of heat resistant, electrical insulating material to form two parallel post portions or halves. The separate posts are preferably connected adjacent one of their ends by a relatively short graphite member or cap, while the parallel portions of the unitary post structure can be connected together at one end by an integral wall structure of the unitary post. Either structure substantially eliminates the breaking problem because the cap or integral wall, due to their relatively short length and small, physical size and mass, do not undergo substantial expansion when the reactor attains an operable reaction temperature. The expansion of the post or posts along their longitudinal axes is free to take place, the cap or integral wall simply moving with the posts. The separate post structures are hollow to provide relatively thin walls to increase the resistance of the posts to the flow of electrical current and thus to increase the heating capabilities of the posts. However, the hollow posts are filled with a heat resistant, electrically insulating material, such as a glass wool fiber, to prevent reduction of the electrical resistance of the posts that would occur by the filling of the posts with carbon bearing material, which material is electrically conductive.

The temperature in the areas of the posts remote from the cap member and the high temperature area within the reactor tend to be in the range in which ferric chloride attacks graphite. To greatly reduce such tendency, the presence of an inert gas is maintained around these cooler portions of the posts to keep chloride constituents away from these portions of the posts.

THE DRAWINGS

Figure 2:
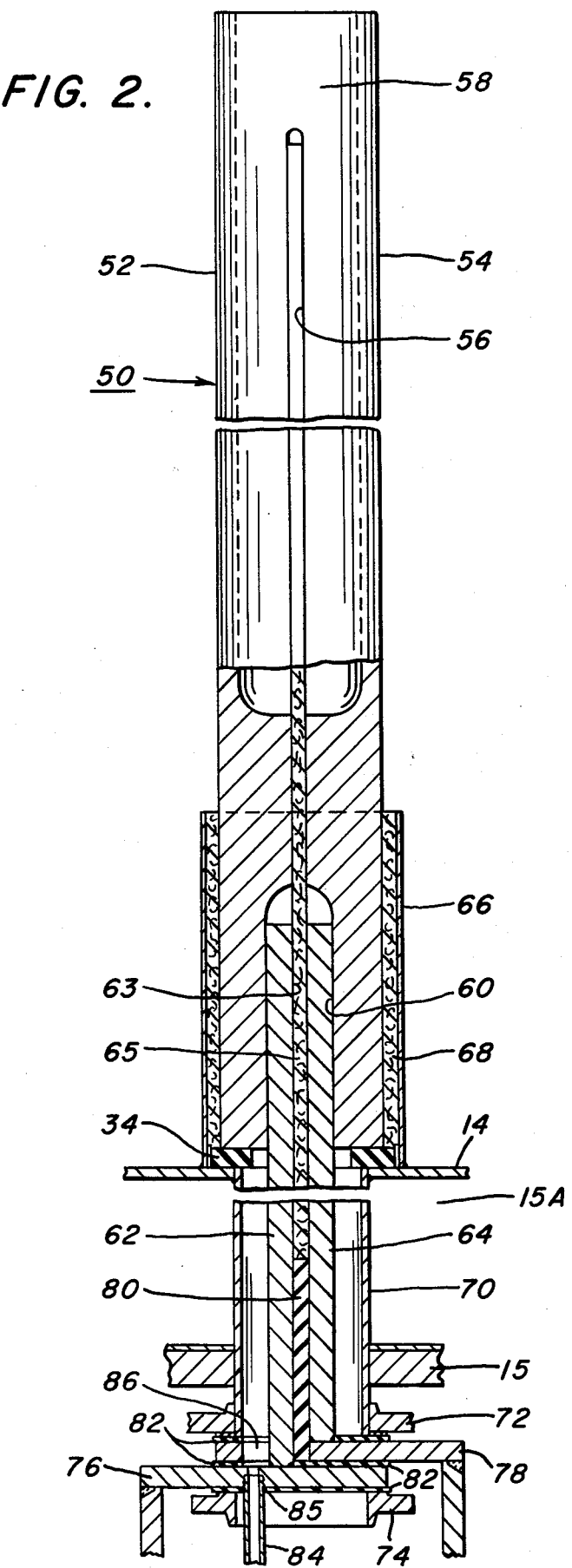
Figure 3:
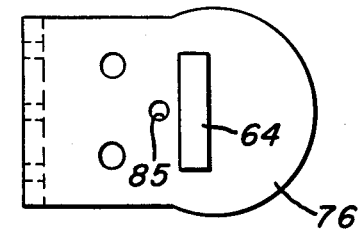
Figure 4:
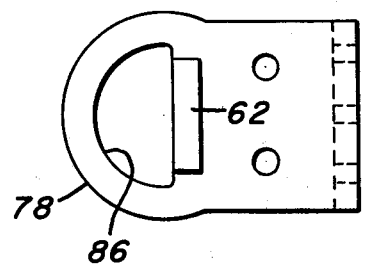

The advantages and objectives of the invention will best be understood from consideration of the following detailed description and the accompanying drawings in which:

FIG. 1 shows in section a heating unit including two vertically disposed heating posts of the invention, FIG. 2 shows a second embodiment of the invention (in partial section and elevation) involving a unitary heating post structure, and FIGS. 3 and 4 are plan views of two leads employed in the embodiment of FIG. 2.

PREFERRED EMBODIMENTS OF THE INVENTION

Referring now to FIG. 1 of the drawings, a structure 10 is shown for heating a fluidized bed 12 of alumina bearing material contained in a reactor and reaction chamber 13 (shown in partial outline) for chlorinating the alumina. Such reactors are shown and described, for example, in U.S. Pat. Nos. 3,796,551, 3,816,078, 3,843,163 and 3,929,975, issued respectively in the names of Pope, Cook et al, Russell et al and King et al. The invention, however, is not limited to the structures disclosed in these patents. For purposes of explanation, however, the reactor structure depicted in FIG. 1 is similar to that of the patent to Pope, in which a fluidized bed of alumina bearing material is maintained by a flow of gaseous chlorine directed upwardly through a gas distribution structure which includes a horizontally disposed distribution plate or grid 14 (in FIG. 1 of the present drawings), having openings 14A and a bed of loosely packed porous refractory spheres 16 supported on the distribution plate. The openings 14A can be provided by drilling a solid plate 14.

Plate 14 and a lower solid plate or wall 15 form a plenum chamber 15A beneath plate 14, with the fluidizing medium being directed to the plenum through a relatively large diameter conduit 15B. In addition, bubble cap structures 14B are shown mounted on plate 14, over each drilled hole, and extend into the bed of spheres (in a well-known manner) to aid in distributing gas flow through chamber 13. As further shown in FIG. 1, the plates 14 and 15 are mounted in, and the refractory spheres 16 are contained in, an open (at the upper and lower ends thereof) vessel 17, the wall of which is depicted as slightly converging in the direction of furnace chamber 13.

Referring further to FIG. 1, heating structure 10 includes two side-by-side, closely spaced, hollow posts 18, the posts being electrically connected together at their upper ends by a cap member 20. The lower ends of the heater posts are disposed in respective containers 21, which are, in turn, located within a common shell and double wall container 23 mounted in the substantial center of gas distribution vessel 17 and the bed of spheres 16, and adapted to support the posts in chamber 13 and in a fluidized bed 12 of alumina bearing material. Between the post containers and the posts are wrappings or packings of asbestos rope 22 which serve to keep corrosive constituents away from the posts.

The double wall structure of shell 23 includes an outer wall structure 23A that is a permanent part of vessel 17. Adjacent the lower end of outer wall 23A is located a fixed annular flange 24A. An inner wall structure 23B (of 23) is shown located within 23A, 23B having a lower plate 24B attached to the lower end of inner wall 23B. A gasket 24C, in combination with flange 24A and plate 24B, seals container 23 when the inner wall structure is inserted into the outer wall structure, and plate 24B is brought into tight engagement (via gasket 24C) with flange 24A.

Metal bars 25 of a high electrical conductivity material, such as copper, extend through plate 24B and into bores 26 provided in the lower ends of the respective posts 18, the diameter of the bores and bars being chosen to provide a tight fit (at operating temperature) between the post and bar for the purpose of establishing good electrical contact between them. Each of the bars is surrounded by a tubular member 27 which extends through plate 24B and between the lower ends of the posts 18 and sealing flanges generally labeled 28. The tubes are secured to plate 24B such as by welding.

Bars 25 are respectively connected to two electrical buses 30, and extend respectively through two relatively thin plates or discs 29, as shown in FIG. 1. The plates 29, in addition, are brazed to the bars (at ledges provided between larger and smaller diameter portions thereof) and extend between flanges 28 to seal the lower ends of tubular containers 27.

As shown in FIG. 1, a wall structure or ledge 32 is provided beneath each of heater posts 18 and their respective containers 21 to support the same, and to seal containers 27 at the upper end thereof by being joined to the containers such as by welding. In addition, the wall 32 restrains posts 18 when and if bars 25 are pulled from the posts. The posts are thermally and electrically separated and insulated from ledges 32 by annular insulating rings 34.

The electrode structure, as thus far described, is insertable into and removable from reactor 13 and vessel 17 as a unit. The unit includes internal container 23B, which supports the heater posts and connecting bars, such that insertion is accomplished by simply inserting container 23B into outer container 23A until plate 24B abuts against flange 24A. Appropriately threaded nuts and bolts can then be used to secure 24A and B together, the bolts extending through aligned openings provided in plate 24B and flange 24A. With the removal of such nuts and bolts, plate 24B is free to be moved away from flange 24A, which removes inner container 23B and the total electrode package from container 23A and vessel 17.

As indicated above, the heater posts 18 are hollow to provide relatively thin walls that increase the electrical resistance of the posts to enhance their heating function. The posts and cap 20 are preferably made of a carbonaceous material such as graphite. To insure good electrical conductivity between the posts and the cap, an electrically conductive, graphite cement or a fine graphite powder can be used to join the cap and posts together.

To maintain the electrical resistance of the posts and thereby their heating function in the fluidized bed environment, the posts are filled with a heat resistant, electrically insulating substance 36, which keeps the carbon value of the alumina bearing material of bed 12 from entering into the posts and reducing the posts' electrical resistance, the carbon value being electrically conductive. Substance 36 may be a glass wool fiber material though other electrically insulating heat resistant materials may be used.

In the operation of the heater unit 10, as thus far described, current is directed into and up one of the posts 18 from one bus 30 and bar 25, through the cap member 20 and down the second post 18 and bar 25 to the second one of buses 30. The amount of current directed through the posts and cap member is such that the posts and cap are heated to a temperature suitable for effecting chlorination of the alumina in the material of bed 12 as chlorine gas is directed through the bed and chamber after passing upwardly through distribution plate 14 and the bed of spheres 16. As the temperature of the posts and the fluidized bed increases, any expansion of the posts is primarily in the axial direction of the posts, with the cap member 20 moving with the posts in the direction of primary expansion. The cap, being relatively small and short in length, does not undergo substantial lateral expansion with the rise in temperature so that cracking and breaking of the heating components does not take place, as in the case of the long, post mounted cap members discussed above.

As explained earlier, graphite is not attacked by chloride constituents in the operating temperature range (500° to 750° C.) of an alumina-chlorine reactor. This is the temperature range of fluidized bed 12 (in the reaction process) so that the portions of heater posts 18 in the fluidized bed are free from chloride attack. However, the portions of the posts beneath bed 12 will tend to be cooler than that of active fluidized bed so that chloride constituents that might reach these portions of the posts will tend to attack the graphite, as well as the metal of bars 25, if the constituents reach the bars. For this reason, a purge of inert gas may be directed into and maintained in tubular members 27, and thus around the metal bars, through two, small diameter pipes 38 respectively connected to appropriate openings provided in seal plates 29. The external surfaces of the lower portions of the posts are protected by the inert gas as it rises through an annular space 40 provided between each bar and its associated spacer 34, and into the area of packing 22, the gas being maintained at a pressure slightly greater than the pressure existing in chamber 13.

FIG. 2 of the drawings shows an embodiment of the invention in which a single post structure 50 is adapted to provide heat in a manner similar to that described above in connection with electrode structure 10. More particularly, post structure 50 comprises a single post made of a carbonaceous material that is longitudinally divided less than the full length of the tubular structure. This can be effected by simply cutting or sawing the post longitudinally to provide two, parallel post sections 52 and 54, the cutting or sawing operation leaving a narrow, elongated slot or space 56 that separates the sections along their length dimension but leaves an integral wall portion 58 at the upper end of post 50.

Like the posts 18 above, the heating portion of 50 is hollow to provide a relatively thin wall that increases the electrical resistance of the post, while the lower portion of the post is solid but provided with a wide slot 60 to receive metal bars 62 and 64. The upper end of post sections 52 and 54, as shown in FIG. 2, are physically and electrically connected together by integral wall portion 58.

The solid, lower end of post 50 is provided with the wide slot or space 60, in communication with narrow slot 56, for accommodating two parallel side-by-side metal bars 62 and 64 of high electrical conductivity material. The thickness of the two bars is such that when they are disposed against inside surfaces of slot 60, and on opposed sides of slot 56, a space 63 is provided between the bars that is aligned with 56 and is of a width corresponding to that of slot 56. In these slots or spaces are disposed heat resistant, electrically insulating material to ensure electrical separation of the post sections 52 and 54 and metal bars 62 and 64, and to reduce the opportunity for corrosive constituents to enter into these spaces. This latter function is preferably effected by asbestos rope packing 65.

In a manner similar to that described above in connection with posts 18, the lower portion of post 50 is supported in a container 66, the container being again filled with a packing material 68 to reduce (again) the opportunity for corrosive constituents to enter in and around the lower portion of the post. Container 66 is supported on and is shown (in FIG. 2) welded to a gas distribution plate 14 of a reactor not otherwise shown in FIG. 2.

The portions of metal bars 62 and 64 located beneath container 66 are contained in a tubular member 70 which is, in turn, rigidly supported in and attached to a horizontal, solid plate 15, as in FIG. 1, which forms plenum 15A with plate 14. The lower end of tubular member 70 is provided with a flange 72 which, in cooperation with a flange member 74, functions to seal the lower end of the member 70 as well as to secure superposed metal leads 76 and 78 in place beneath 70. The upper end of 70 is sealed to distribution plate 14, such as by welding.

Leads 76 and 78 are plate-like structures (FIGS. 3 and 4) that respectively connect bars 62 and 64 to a source (not shown) of electrical current, the lower ends of the bars being respectively suitably attached, such as by brazing or welding, to the leads. As shown in FIG. 2, an insulating plate or spacer 80, located in space 63 between the bars, extends down to lowermost lead 76 to insulate upper lead 78 from the lower end of bar 62, and the leads 76 and 78 are insulated from each other and from flanges 72 and 74 by three insulating gaskets or discs 82. Insulated bolts (not shown) can be used to secure the flanges together about gaskets 82 and leads 76 and 78.

As shown in FIG. 2 a pipe 84 of small diameter can be secured in an opening 85 extending through the lowermost lead 76, and an opening 86 provided in the upper lead 78 over the pipe to permit a flow of inert gas into tubular member 70 and about bars 62 and 64, the gas also flowing upwardly into the area of container 66 and post 50 to protect the same from chloride attack.

The operation of heating post 50 is substantially the same as that described above in connection with heating unit 10, i.e., current is directed into lead 76 or 78, and up through bar 62 or 64 into one section (52 or 54) of post 50. Current travels from the one post section to the other via integral wall 58 of the post, and returns down the other post section through the bar and lead associated therewith. In this manner, the post sections 52 and 54 and integral wall portions 58 are heated to effect, as described earlier, the alumina-chlorine reaction. Post 50, however, has the advantage of allowing the use of AC current as the heating current more effectively than heating structure 10. In the heating unit of FIG. 1, a substantial amount of metal, in the form of flanges 28, containers 27 and associated hardware, is located between current conductors 25 such that, with the use of AC current, AC energy is induced in this metal, which creates energy (induction) losses that must be compensated for in order to provide the necessary amount of current through heating posts 18. In the embodiment of FIG. 2 there is no metal material between leads 76 and 78 and bars 62 and 64 in which AC energy can be induced.

While the invention has been described in terms of preferred embodiments, the claims appended hereto are intended to encompass all embodiments which fall within the spirit of the invention.

Having thus described our invention and certain embodiments thereof, we claim:

1. In combination,
    a reaction chamber for producing aluminum chloride from a reaction of chlorine with alumina and carbon,
    a reaction bed of material comprised of alumina particles and a carbon constituent located within said chamber for reaction with gaseous chlorine,
    means for fluidizing said reaction bed of material with gaseous chlorine,
    an electrical resistance heater comprising at least two, closely spaced, side-by-side, elongated posts made of a carbonaceous material, and extending into the midst of the reaction chamber and fluidized reaction bed from a location outside of the chamber and reaction bed so that one end of each post is located within the chamber and reaction bed, in physical contact with the reaction bed of material, while the other end of each post is located outside of the chamber and reaction bed,
    means made of carbonaceous material electrically connecting the posts together within the chamber and reaction bed, the posts and connecting means being effective to directly heat the fluidized reaction bed of material by the resistance of the posts and connecting means to the flow of electrical current directed therethrough,
    two metal bars extending respectively into the ends of the posts located outside of the chamber for conducting current to and from the posts, and means for mounting the posts in a manner that locates the one end thereof in the reaction chamber.

2. A method for producing aluminum chloride from a reaction of chlorine with alumina and carbon, the method comprising the steps of providing a reaction chamber and a reaction bed of alumina-bearing particles in said chamber, the particles containing a carbon component, fluidizing said bed with chlorine gas, locating two closely spaced apart posts made of a carbonaceous material in the midst of the bed, directing electrical current serially through the posts, limiting the flow of current to the posts, utilizing the resistance of the posts to the flow of electrical current to produce heat within the bed, and utilizing this heat to directly heat the bed to above 400° C. and thereby effect reaction of the chlorine gas with the alumina and carbon to produce aluminum chloride.

* * * * *